United States Patent [19]

Abusleme et al.

[11] Patent Number: 5,428,122
[45] Date of Patent: Jun. 27, 1995

[54] RADICAL (CO) POLYMERIZATION PROCESS OF FLUORINATED OLEFINIC MONOMERS IN AQUEOUS EMULSION

[75] Inventors: Julio A. Abusleme, Saronno; Patrizia Maccone, Milan, both of Italy

[73] Assignee: Ausimont S.p.A., Milan, Italy

[21] Appl. No.: 243,242

[22] Filed: May 16, 1994

[30] Foreign Application Priority Data

May 18, 1993 [IT] Italy .................... MI93A1008

[51] Int. Cl.⁶ ............................... C08F 2/00
[52] U.S. Cl. ..................... 526/209; 526/255
[58] Field of Search ............ 526/206, 209, 255

[56] References Cited

U.S. PATENT DOCUMENTS

| | | |
|---|---|---|
| 2,515,628 | 7/1950 | Castle . |
| 2,520,388 | 8/1950 | Earl . |
| 3,242,218 | 3/1966 | Miller . |
| 3,467,635 | 9/1969 | Brasen et al. . |
| 3,624,250 | 11/1971 | Carlson . |
| 3,715,378 | 2/1972 | Sianesi et al. . |
| 3,865,845 | 2/1975 | Resnick . |
| 3,978,030 | 8/1976 | Resnick . |
| 4,243,770 | 1/1981 | Tatemoto et al. . |
| 4,426,501 | 1/1984 | Khan . |
| 4,451,646 | 5/1984 | Sianesi et al. . |
| 4,513,129 | 4/1985 | Nakagawa et al. . |
| 4,675,380 | 6/1987 | Buckmaster . |
| 4,694,045 | 9/1987 | Moore . |
| 4,864,006 | 9/1989 | Giannetti et al. ............ 526/206 |
| 4,973,633 | 11/1990 | Moore . |
| 4,990,283 | 2/1991 | Visca et al. . |
| 5,087,679 | 2/1992 | Inukai et al. . |
| 5,091,589 | 2/1992 | Meyer et al. . |

FOREIGN PATENT DOCUMENTS

| | | |
|---|---|---|
| 073087 | 3/1983 | European Pat. Off. . |
| 076581 | 4/1983 | European Pat. Off. . |
| 080187 | 6/1983 | European Pat. Off. . |
| 148482 | 7/1985 | European Pat. Off. . |
| 154297 | 9/1985 | European Pat. Off. . |
| 244839 | 11/1987 | European Pat. Off. . |
| 0250767 | 1/1988 | European Pat. Off. ............ 526/206 |
| 337346 | 10/1989 | European Pat. Off. . |
| 407937 | 1/1991 | European Pat. Off. . |
| 445738 | 9/1991 | European Pat. Off. . |
| 518073 | 12/1992 | European Pat. Off. . |
| 1104482 | 2/1968 | United Kingdom . |

OTHER PUBLICATIONS

Encyclopedia Of Chemical Technology, vol. 8, pp. 500–515 (1979).

*Primary Examiner*—Joseph L. Schofer
*Assistant Examiner*—N. Sarofim
*Attorney, Agent, or Firm*—Stevens, Davis, Miller & Mosher

[57] ABSTRACT

Fluorinated olefinic monomers, optionally in association with non-fluorinated olefins, are (co)polymerized in aqueous emulsion in the presence of a hydrophilic solvent and of a fluoropolyoxyalkylene having hydrogenated end groups and/or hydrogenated repetitive units. In this way it is possible to obtain high productivities, close to those obtainable using a hydrophilic solvent and a chlorofluorocarbon.

7 Claims, No Drawings

RADICAL (CO) POLYMERIZATION PROCESS OF FLUORINATED OLEFINIC MONOMERS IN AQUEOUS EMULSION

The present invention relates to a (co)polymerization process in aqueous emulsion of fluorinated olefinic monomers.

(Co)polymerization processes of fluorinated olefinic monomers in aqueous emulsion are known in the art, wherein a couple of solvents, the former hydrophilic, the latter hydrophobic, is added to the reaction medium, to increase the solubility of the monomers in the reaction medium, thus increasing the reaction rate. Alcohols are usually employed as hydrophilic solvents, while the hydrophobic solvent is a chlorofluorocarbon (CFC).

For instance, in the patent U.S. Pat. No. 4,426,501 the copolymerization of tetrafluoroethylene with ethylene is carried out in aqueous emulsion in the presence of terbutyl alcohol as hydrophilic solvent and of 1,1,2-trichloro-1,2,2-trifluoroethane (CFC 113) as hydrophobic solvent.

The use of CFCs as hydrophobic solvents results particularly advantageous as they are products having high affinity with the fluorinated part of the monomers and, if appropriately selected, do not act as chain transfer agents in the usual polymerization conditions. As well known, however, the CFCs deplete the ozone layer of the atmosphere, therefore in a few years they will have to be completely replaced by products with a low ODP (Ozone Depletion Potential).

The Applicant has now surprisingly found that, using fluoropolyoxyalkylenes having hydrogenated end groups and/or hydrogenated repetitive units as hydrophobic solvents in copolymerization processes of fluorinated olefinic monomers in aqueous emulsion, it is possible to obtain high productivities, close to those obtainable with CFCs, without, however, causing environmental pollution problems, since they are products with a very low ODP.

Such a result is particularly surprising since, on the basis of the experimentation carried out by the Applicant, the use of perfluoropolyoxyalkylenes instead of CFCs gives unsatisfactory results, with low productivities, slightly higher than those obtainable, in the same conditions, without the addition of the solvent couple.

Moreover, the perfluoropolyoxyalylenes having hydrogenated end groups and/or hydrogenated repetitive units, as hereinafter defined, do not cause undesired chain transfer effects, either at high polymerization temperatures (50°–100° C.), or, even less, when operating at low temperatures, as for instance in the case of the preparation of HALAR ® (ethylene-chlorotrifluoroethylene copolymer), which is usually polymerized at 10°–20° C.

Object of the present invention is therefore a radical (co) polymerization process of one or more fluorinated olefinic monomers, optionally in association with one or more non-fluorinated olefins, in which said monomers are (co)polymerized in aqueous emulsion in the presence of a hydrophilic solvent and of a fluoropolyoxyalkylene having hydrogenated end groups and/or hydrogenated repetitive units.

Such fluoropolyoxyalkylene is constituted by repetitive units, randomly distributed along the chain, selected from:

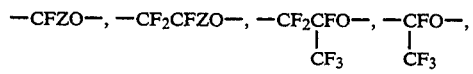

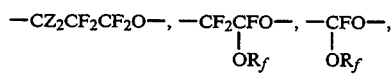

where Z is H or F, $R_f$ is $-CF_3$, $-C_2F_5$, or $-C_3F_7$;

and by hydrogenated end groups selected from $-CF_2H$, $-CF_2CF_2H$, $-CFH-CF_3$, and $-CFH-OR_f$, where $R_f$ is defined as above, or perfluorinated end groups selected from $-CF_3$, $-C_2F_5$, and $C_3F_7$, at least one of the end groups being hydrogenated.

The average moelcular weight is generally comprised between 300 and 4000, preferably between 400 and 1500.

In particular, such fluoropolyoxyalkylenes can be selected from the following classes:

(a) 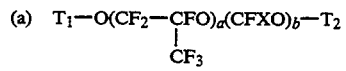

where: $T_1$ and $T_2$, equal or different from each other, are hydrogenated groups $-CF_2H$, $-CFH-CF_3$, or perfluorinated groups $-CF_3$, $-C_2F_5$, $-C_3F_7$, at least one of the end groups being hydrogenated; X is $-F$ or $-CF_3$; a, b are numbers such that the molecular weight is comprised in the range indicated above, a/b is comprised between 5 and 15;

(b) $T_3-O(CF_2CF_2O)_c(CF_2O)_d-T_4$ where: $T_3$ and $T_4$, equal or different from each other, are hydrogenated groups $-CF_2H$ or $-CF_2-CF_2H$, or perfluorinated groups $-CF_3$, $-C_2F_5$, at least one of the end groups being hydrogenated; c, d are numbers such that the molecular weight is comprised in the range indicated above, c/d is comprised between 0.3 and 5;

(c) 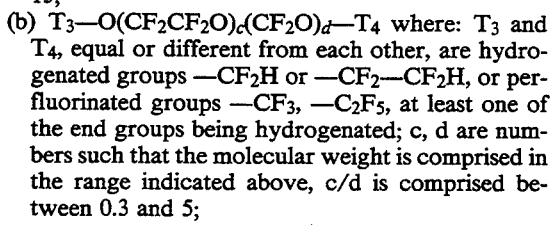

where: $T_5$ and $T_6$, equal or different from each other, are hydrogenated groups $-CF_2H$, $-CF_2CF_2H$, or $-CFH-CF_3$, or perfluorinated groups $-CF_3$, $-C_2F_5$, $-C_3F_7$, at least one of the end groups being hydrogenated; X is $-F$ or $-CF_3$; e, f, g are numbers such that the molecular weight is comprised in the range indicated above, e/(f+g) is comprised between 1 and 10, f/g is comprised between 1 and 10;

(d) 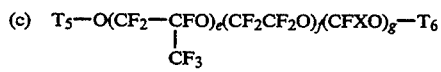

where: $T_7$ and $T_8$ are hydrogenated groups $-CFH-CF_3$, or perfluorinated groups $-C_2F_5$, $-C_3F_7$, at least one of the end groups being hydrogenated; h is a number such that the molecular weight is comprised in the range indicated above;

(e) $T_9-O(CZ_2CF_2CF_2O)_l-T_{10}$ where: Z is F or H; $T_9$ and $T_{10}$, equal or different from each other, are hydrogenated groups $-CF_2H$ or $-CF_2CF_2H$, or perfluorinated groups —CF$_3$, —C$_2$F$_5$, —C$_2$F$_7$, at least one of the end groups being hydrogenated; i is a number such that the molecular weight is comprised in the range indicated above;

(f) 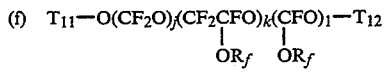
$$T_{11}-O(CF_2O)_j(CF_2CFO)_k(CFO)_l-T_{12}$$
$$\qquad\qquad\qquad |\quad\ \ |$$
$$\qquad\qquad\quad OR_f\ OR_f$$

where: R$_f$ is —CF$_3$, —C$_2$F$_5$, or —C$_3$F$_7$; T$_{11}$ and T$_{12}$, equal or different from each other, are hydrogenated groups —CF$_2$H, —CF$_2$CF$_2$H, —CFH—OR$_f$, or perfluorinated groups —CF$_3$, —C$_2$F$_5$, —C$_3$F$_7$, at least one of the end groups being hydrogenated; j, k, l are numbers such that the molecular weight is comprised in the range indicated above, k+l and j+k+l are at least equal to 2, k/(j+l) is comprised between $10^{-2}$ and $10^3$, l/j is comprised between $10^{-2}$ and $10^2$;

(g) 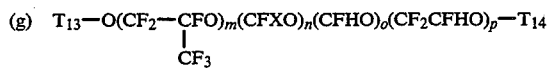
$$T_{13}-O(CF_2-CFO)_m(CFXO)_n(CFHO)_o(CF_2CFHO)_p-T_{14}$$
$$\qquad\qquad\quad\ |$$
$$\qquad\qquad\ CF_3$$

where: T$_{13}$ and T$_{14}$, equal or different from each other, are hydrogenated groups —CF$_2$H, —CFH—CF$_3$, or perfluorinated groups —CF$_3$, —C$_2$F$_5$, —C$_3$F$_7$, at least one of the end groups being hydrogenated; X is —F or —CF$_3$; m, n, o, p are numbers such that the molecular weight is comprised in the range indicated above, m/n is comprised between 5 and 40, m/(o+p) is comprised between 2 and 50, o+p is at least 3, o is lower than p;

(h) T$_{15}$-O(CF$_2$CF$_2$O)$_q$(CF$_2$O)$_r$(CFHO)$_s$(CF$_2$CFHO)$_t$—T$_{16}$
where: T$_{15}$ and T$_{16}$, equal or different from each other, are hydrogenated groups —CF$_2$H, —CF$_2$—CF$_2$H, or perfluorinated groups —CF$_3$, —C$_2$F$_5$, at least one of the end groups being hydrogenated; q, r, s, t are numbers such that the molecular weight is comprised in the range indicated above, q/r is comprised between 0.5 and 2, (q+r)/(s+t) is comprised between 3 and 40, s+t is at least 3, s is lower than t;

(i) 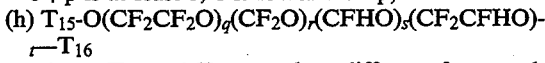
$$T_{17}-O(CF_2-CFO)_u(CF_2CF_2O)_v(CFXO)_w(CFHO)_x(CF_2CFHO)_y-T_{18}$$
$$\qquad\qquad\quad\ |$$
$$\qquad\qquad\ CF_3$$

where T$_{17}$ and T$_{18}$, equal or different from each other, are hydrogenated groups —CF$_2$H, —CF$_2$CF$_2$H, —CFH—CF$_2$, or perfluorinated groups —CF$_3$, —C$_2$F$_5$, —C$_3$F$_7$, at least one of the end groups being hydrogenated: X is —F or —CF$_3$; u, v, w, x, y are numbers such that the molecular weight is comprised in the range indicated above, (u+v)/w is comprised between 5 and 40, (u+v)/(x+y) is comprised between 2 and 50, x+y is at least 3, x is lower than y.

They are products obtainable by hydrolysis and subsequent decarboxylation of the —COF groups present in the corresponding perfluoropolyoxyalkylenes, as described for instance in the patents EP-154,297, U.S. Pat. No. 4,451,646 and U.S. Pat. No. 5,091,589.

The starting perfluoropolyethers containing —COF end groups are described, for instance, in the patents GB-1,104,482 (class (a)), U.S. Pat. No. 3,715,378 (class (b)), U.S. Pat. No. 3,242,218 (class (c)), U.S. Pat. No. 3,242,218 (class (d)), EP-148,482 (class (e)), EP-445,738 (class (f)), EP-244,839 and EP-337,346 (classes (g), (h), (i)).

With "hydrophilic solvent" it is meant a solvent soluble in water at the polymerization temperature, to such an extent to form aqueous solutions containing preferably at least 5% by weight of the solvent. Such solvents can be selected from the class of aliphatic alcohols having from 1 to 8 carbon atoms, such as methanol, isopropanol, terbutanol, pinacol, etc.

The total amount of fluoropolyoxyalkylene and of hydrophilic solvent to be employed in the process object of the present invention is generally not higher than 15% by weight, preferably from 2 to 10% by weight, with respect to the total amount of water present in the reaction medium.

As well known in the art, the (co)polymerization reaction occurs in the presence of suitable initiators, such as inorganic peroxides (for instance, ammonium or alkali metal persulphates) or organic peroxides (for instance, disuccinylperoxide, terbutyl-hydroperoxide, diterbutylperoxide), or also azocompounds (see U.S. Pat. No. 2,515,628 and U.S. Pat. No. 2,520,338). It is also possible to employ organic or inorganic redox systems, such as ammonium persulphate/sodium sulphite, hydrogen peroxide/aminoimimomethansulphinic acid. The amount of radical initiator is that usually employed for the (co)polymerization of fluorinated olefinic monomers, and is generally comprised between 0.003% and 2% by weight with respect to the total amount of (co)polymerized monomers.

As known, the emulsion technique requires also the presence of surfactants. Among the various types of surfactants employable in the process object of the present invention, we cite in particular the products of formula:

$$R_f-X^-M^+$$

where R$_f$ is a (per) fluoroalkyl chain C$_5$-C$_{16}$ or a (per)-fluoropolyoxyalkylene chain, X$^-$ is —COO$^-$ or —SO$_3$$^-$, M$^+$ is selected from: H$^+$, NH$_4$$^+$, alkali metal ion. Among the most commonly used we cite: ammonium perfluoro-octanoate, (per) fluoropolyoxyalkylenes end-capped with one or more carboxylic groups, etc.

To the reaction mixture there can be added also chain transfer agents, such as: hydrogen; hydrocarbons or fluorohydrocarbons (for instance methane or ethane); ethyl acetate; diethylmalonate; iodinated and/or bromiated chain transfer agents, such as for instance the compounds of formula R$_f$(I)$_x$(Br)$_y$, where R$_f$ is a (per) fluoroalkyl or a (per) fluorochloroalkyl having from 1 to 8 carbon atoms, while x and y are integers comprised between 0 and 2, with 1≦y+s≦2. It is also possible to employ as chain transfer agent hydrogen or an aliphatic hydrocarbon or fluorohydrocarbon in association with a branched chain aliphatic alcohol, as described in Italian patent application No. MI93A/000551 in the name of the Applicant.

The reaction temperature can vary within a wide range, generally comprised between 10° and 100° C., preferably between 50° and 80° C., while the pressure is generally comprised between 10 and 100 bar, preferably between 15 and 40 bar.

The process object of the present invention can be employed with all kinds of fluorinated olefinic monomers, optionally containing hydrogen and/or chlorine and/or bromine and/or iodine and/or oxygen, provided that they are able to give (co)polymers by reaction with radical initiators in aqueous emulsion. Among them we can cite: perfluoroolefins $C_2$-$C_8$, such as tetrafluoroethylene (TFE), hexafluoropropene (HFP), hexafluoroisobutene; hydrogenated fluoroolefins $C_2$-$C_8$, such as vinylfluoride (VF), vinylidene fluoride (VDF), trifluoroethylene, perfluoroalkylethylenes $CH_2=CH$-$R_f$, where $R_f$ is a perfluoroalkyl $C_1$-$C_6$; chloro- and/or bromo- and/or iodo-fluoroolefins $C_2$-$C_8$, such as chlorotrifluoroethylene (CTFE) and bromotrifluoroethylene; (per)fluorovinylethers $CF_2=CFOX$, where X is a (per)fluoroalkyl $C_1$-$C_6$, for instance trifluoromethyl, pentafluoropropyl, bromodifluoromethyl, or a perfluorooxyalkyl $C_1$-$C_9$ having one or more ether groups, for instance perfluoro-2-propoxypropyl; perfluorodioxols.

The fluoroolefins can also be copolymerized with nonfluorinated olefins $C_2$-$C_8$, such as ethylene, propylene, isobutylene.

The process object of the present invention is preferably employed for the radical (co)polymerization of partially fluorinated olefinic monomers, or for the copolymerization of perfluorinated olefinic monomers with non-fluorinated olefins.

Among the polymers to which the process object of the present invention is applicable, there are particularly comprised:

(a) "modified" polytetrafluoroethylene, containing small amounts, generally comprised between 0.1 and 3% by mols, preferably lower than 0.5% by mols, of one or more comonomers such as, for instance: perfluoropropene, perfluoroalkylvinylethers, vinylidene fluoride, hexafluoroisobutene, chlorotrifluoroethylene, perfluoroalkylethylenes;

(b) TFE thermoplastic polymers containing from 0.5 to 8% by mols of at least a perfluoroalkylvinylether, where the alkyl has from 1 to 6 carbon atoms, such as, for instance, TFE/perfluoropropylvinylether, TFE/perfluoromethylvinylether, TFE/perfluoroalkylethylene copolymers;

(c) TFE thermoplastic polymers containing from 2 to 20% by mols of a perfluoroolefin $C_3$-$C_8$, such as, for instance, FEP (TFE/HFP copolymer), to which other comonomers having vinylether structure (see for instance the patent U.S. Pat. No. 4,675,380), can be added in small amounts (lower than 5% by mols);

(d) TFE or CTFE copolymers with ethylene, propylene or isobutylene, optionally containing a third fluorinated comonomer in amounts comprised between 0.1 and 10% by mols (see for instance the patents U.S. Pat. No. 3,624,250 and U.S. Pat. No. 4,513,129);

(e) TFE elastomeric copolymers with a perfluoroalkylvinylether or a perfluorooxyalkylvinylether, optionally containing propylene or ethylene, besides lower amounts of a "cure-site" monomer (see for instance the patents U.S. Pat. No. 3,467,635 and U.S. Pat. No. 4,694,045);

(f) polymers having dielectric characteristics, comprising 60-79% by mols of VDF, 18-22% by mols of trifluoroethylene and 3-22% by mols of CTFE (see the patent U.S. Pat. No. 5,087,679);

(g) VDF elastomeric polymers, such as VDF/HFP copolymers and VDF/HFP/TFE terpolymers (see, for instance, the patent GB-888,765 and Kirk-Othmer, "Encyclopedia of Chemical Technology", Vol. 8, pag. 500–515 - 1979); such polymers can also contain: hydrogenated olefins, such as ethylene and propylene (as described for instance in EP-518,073); perfluoroalkylvinylethers; brominated "cure-site" comonomers and/or terminal iodine atoms, as described, for instance, in U.S. Pat. No. 4,243,770, U.S. Pat. No. 4,973,633 and EP-407,937;

(h) polyvinylidene fluoride or modified polyvinylidene fluoride containing little amounts, generally comprised between 0.1 and 10% by mols, of one or more fluorinated comonomers, such as hexafluoropropene, tetrafluoroethylene, trifluoroethylene.

The polymers of the above indicated classes, and in particular the polymers based on TFE, can be modified with perfluorinated dioxols, as described for instance in the patents U.S. Pat. No. 3,865,845, U.S. Pat. No. 3,978,030, EP-73,087, EP-76,581, EP-80,187.

Some working examples are hereinafter reported, whose aim is merely illustrative but not limitative of the scope of the invention itself.

EXAMPLE 1

A 5 l AISI 316 steel chromium-plated autoclave, equipped with a stirrer working at 570 rpm, was evacuated and there were sequentially introduced: 3.2 l of demineralized $H_2O$; 13.4 g of a Galden ® surfactant of formula:

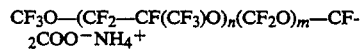

having n/m=10 and an average molecular weight of about 600; 120 g of terbutanol and 225 g of a fluoropolyoxyalkylene having hydrogenated end groups of formula:

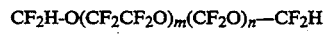

having m/n=0.95 and an average molecular weight of 365.

The autoclave was then brought to the reaction temperature of 60° C. and loaded with ethylene and TFE in such amounts to obtain, at the working pressure of 22 absolute bars, an ethylene/TFE ratio in the gas phase equal to about 20/80 by mols. When the working pressure was reached, ammonium persulphate (APS) in the form of an aqueous solution was continuously fed for 2 hours with a flow rate of $3 \cdot 10^{-3}$ g/l·min.

After 252 minutes the reaction was stopped by cooling the autoclave at room temperature. The so obtained latex was then discharged, coagulated by mechanical stirring, washed with $H_2O$ and dried. 908 g of an ethylene/TFE copolymer were obtained. The measured productivity values ($R_p$) are reported in Table 1.

EXAMPLE 2 (comparative)

Example 1 was repeated under the same conditions, using 3.5 l of $H_2O$ of demineralized water and without adding either terbutanol or the fluoropolyoxyalkylene having hydrogenated end groups.

After 149 minutes the reaction was stopped and 320 g of an ethylene/TFE copolymer were obtained. The measured productivity values ($R_p$) are reported in Table 1.

EXAMPLE 3 (comparative)

Example 1 was repeated in the same conditions, using 225 g of $CCl_2F-CClF_2$ (CFC-113) instead of the fluoropolyoxyalkylene having hydrogenated end groups.

After 164 minutes the reaction was stopped and 930 g of an ethylene/TFE copolymer were obtained. The measured productivity values ($R_p$) are reported in Table 1.

EXAMPLE 4 (comparative)

Example 1 was repeated in the same conditions, using, instead of the fluoropolyoxyalkylene having hydrogenated end groups, 225 g of Galden® D02 of formula:

$$CF_3O-(CF_2-CF(CF_3)O)_n(CF_2O)_m-CF_3$$

having n/m=20 and an average molecular weight of 450.

After 340 minutes the reaction was stopped and 842 g of an ethylene/TFE copolymer were obtained. The measured productivity values ($R_p$) are reported in Table 1.

TABLE 1

| EX. | REACTION TIME (min) | OBTAINED POLYMER (g) | $R_p$ ($g/l_{H2O}$/min) |
|---|---|---|---|
| 1 | 252 | 908 | 1.03 |
| 2(*) | 149 | 320 | 0.61 |
| 3(*) | 164 | 930 | 1.62 |
| 4(*) | 340 | 842 | 0.71 |

(*)comparative examples.

What is claimed is:

1. Radical (co)polymerization process in aqueous emulsion of one or more olefinic fluorinated monomers, optionally in association with one or more non-fluorinated olefins, wherein said monomers are (co)polymerized in aqueous emulsion in the presence of a hydrophilic solvent and of fluoropolyoxyalkylene having hydrogenated end groups and/or hydrogenated repetitive units.

2. The process according to claim 1, wherein the fluoropolyoxyalkylene is constituted by repetitive units, randomly distributed along the chain, selected from:

$$-CFZO-, -CF_2CFZO-, -CF_2CFO-, -CFO-,$$
$$\qquad\qquad\qquad\qquad\quad\; |\qquad\quad\; |$$
$$\qquad\qquad\qquad\qquad\; CF_3\qquad CF_3$$

$$-CZ_2CF_2CF_2O-, -CF_2CFO-, -CFO-,$$
$$\qquad\qquad\qquad\qquad\quad |\qquad\quad |$$
$$\qquad\qquad\qquad\qquad OR_f\qquad OR_f$$

where Z is H or F, $R_f$ is $-CF_3$, $-C_2F_5$, or $-C_3F_7$; and from hydrogenated end groups selected from $-CF_2H$, $CF_2CF_2H$, $-CFH-CF_3$, and $-CFH-OR_f$, where $R_f$ is defined as above, or perfluorinated end groups selected from $-CF_3$, $-C_2F_5$ and $-C_3F_7$, at least one of the end groups being hydrogenated.

3. The process according to claim 2, wherein the average molecular weight of the fluoropolyoxyalkylene is comprised between 300 and 4000.

4. The process according to claim 3, wherein the average molecular weight of the fluoropolyoxyalkylene is comprised between 400 and 1500.

5. The process according to claim 2 wherein the fluoropolyoxyalkylene is selected from the following classes:

(a) $T_1-O(CF_2-CFO)_a(CFXO)_b-T_2$
$\qquad\qquad\qquad\quad\; |$
$\qquad\qquad\qquad CF_3$ where: $T_1$ and $T_2$, equal or different from each other, are hydrogenated groups $-CF_2H$, $-CFH-CF_3$, or perfluorinated groups $-CF_3$, $-C_2F_5$, $-C_3F_7$, at least one of the end groups being hydrogenated; X is $-F$ or $-CF_3$; a, b are numbers such that the molecular weight is comprised in the range indicated above, a/b is comprised between 5 and 15;

(b) $T_3-O(CF_2CF_2O)_c(CF_2O)_d-T_4$ where: $T_3$ and $T_4$, equal or different from each other, are hydrogenated groups $-CF_2H$ or $-CF_2-CF_2H$, or perfluorinated groups $-CF_3$, $-C_2F_5$, at least one of the end groups being hydrogenated; c, d are numbers such that the molecular weight is comprised in the range indicated above, c/d is comprised between 0.3 and 5;

(c) $T_5-O(CF_2-CFO)_e(CF_2CF_2O)_f(CFXO)_g-T_6$
$\qquad\qquad\qquad\qquad |$
$\qquad\qquad\qquad\quad\; CF_3$ where: $T_5$ and $T_6$, equal or different from each other, are hydrogenated groups $-CF_2H$, $-CF_2CF_2H$, or $-CFH-CF_3$, or perfluorinated groups $-CF_3$, $-C_2F_5$, $-C_3F_7$, at least one of the end groups being hydrogenated; X is $-F$ or $-CF_3$; e, f, g are numbers such that the molecular weight is comprised in the range indicated above, e/(f+g) is comprised between 1 and 10, f/g is comprised between 1 and 10;

(d) $T_7-O(CF_2-CFO)_h-T_8$
$\qquad\qquad\qquad |$
$\qquad\qquad\; CF_3$ where: $T_7$ and $T_8$ are hydrogenated groups $-CFH-CF_3$, or perfluorinated groups $-C_2F_5$, $-C_3F_7$, at least one of the end groups being hydrogenated; h is a number such that the molecular weight is comprised in the range indicated above;

(e) $T_9-O(CZ_2CF_2CF_2O)_i-T_{10}$ where: Z is F or H; $T_9$ and $T_{10}$, equal or different from each other, are hydrogenated groups $-CF_2H$ or $-CF_2-CF_2H$, or perfluorinated groups $-CF_3$, $-C_2F_5$, $-C_3F_7$, at least one of the end groups being hydrogenated; is a number such that the molecular weight is comprised in the range indicated above;

(f) $T_{11}-O(CF_2O)_j(CF_2CFO)_k(CFO)_l-T_{12}$
$\qquad\qquad\qquad\qquad\quad |\qquad |$
$\qquad\qquad\qquad\qquad OR_f\; OR_f$ where: $R_f$ is $-CF_3$, $-C_2F_5$, or $-C_3F_7$; $T_{11}$ and $T_{12}$, equal or different from each other, are hydrogenated groups —$CF_2H$, —$CF_2CF_2H$, —CFH-$OR_f$, or perfluorinated groups —$CF_3$, —$C_2F_5$, —$C_3F_7$, at least one of the end groups being hydrogenated; j, k, l are numbers such that the molecular weight is comprised in the range indicated above, k+l and j+k+l are at least equal to 2, k/(j+l) is comprised between $10^{-2}$ and $10^3$, l/j is comprised between $10^{-2}$ and $10^2$;

(g) 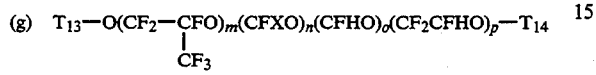

where: $T_{13}$ and $T_{14}$, equal or different from each other, are hydrogenated groups —$CF_2H$, —CFH—$CF_3$, or perfluorinated groups —$CF_3$, —$C_2F_5$, —$C_3F_7$, at least one of the end groups being hydrogenated; X is —F or —$CF_3$; m, n, o, p are numbers such that the molecular weight is comprised in the range indicated above, m/n is comprised between 5 and 40, m/(o+p) is comprised between 2 and 50, o+p is at least 3, o is lower than p;

(h) $T_{15}$-O$(CF_2CF_2O)_q(CF_2O)_r(CFHO)_s(CF_2CFHO)_t$-$T_{16}$ where: $T_{15}$ and $T_{16}$, equal or different from each other, are hydrogenated groups —$CF_2H$, —$CF_2$—$CF_2H$, or perfluorinated groups —$CF_3$, —$C_2F_5$, at least one of the end groups being hydrogenated; q, r, s, t are numbers such that the molecular weight is comprised in the range indicated above, q/r is comprised between 0.5 and 2, (q+r) / (s+t) is comprised between 3 and 40, s+t is at least 3, s is lower than t;

(i) 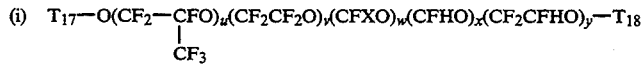

where: $T_{17}$ and $T_{18}$, equal or different from each other, are hydrogenated groups —$CF_2H$, —$CF_2CF_2H$, —CFH—$CF_3$, or perfluorinated groups —$CF_3$, —$C_2F_5$, —$C_3F_7$, at least one of the end groups being hydrogenated; X is —F or —$CF_3$; u, v, w, x, y are numbers such that the molecular weight is comprised in the range indicated above, (u+v)/w is comprised between 5 and 40, (u+v)/(x+y) is comprised between 2 and 50, x+y is at least 3, x is lower than y.

6. The process according to claim 1, wherein the hydrophilic solvent is an aliphatic alcohol having from 1 to 8 carbon atoms.

7. The process according to anyone claim 1, wherein partially fluorinated olefinic monomers, or perfluorinated olefinic monomers with non-fluorinated olefins are (co)polymerized.

* * * * *